UNITED STATES PATENT OFFICE.

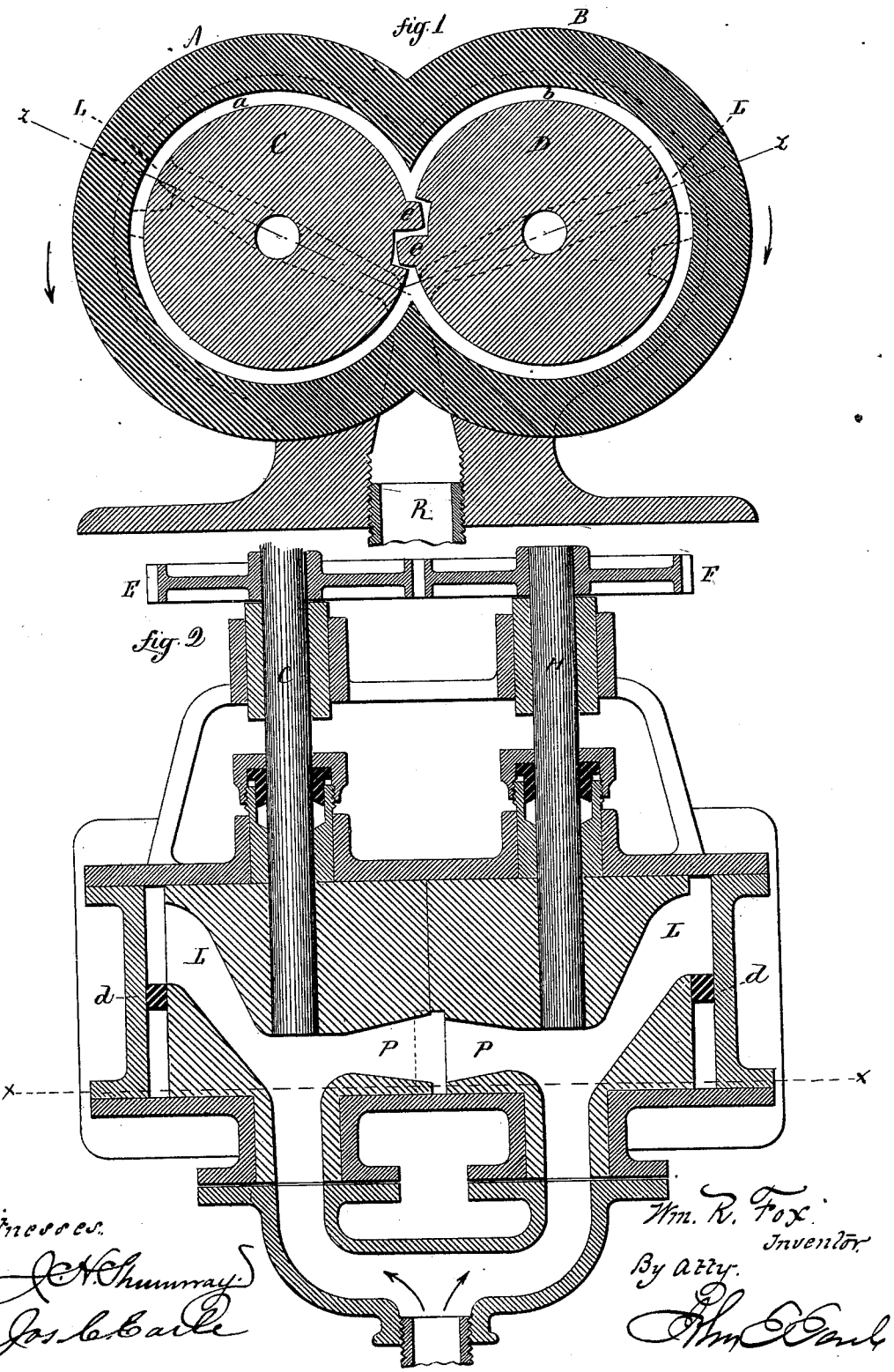

WILLIAM R. FOX, OF TURNERVILLE, CONNECTICUT.

IMPROVEMENT IN WATER-MOTORS.

Specification forming part of Letters Patent No. 213,885, dated April 1, 1879; application filed February 17, 1879.

*To all whom it may concern:*

Be it known that I, WM. R. FOX, of Turnerville, in the county of Tolland and State of Connecticut, have invented a new Improvement in Water-Motors; and do hereby declare the following, when taken in connection with the accompanying drawings and the letters of reference marked thereon, to be a full, clear, and exact description of the same, which said drawings constitute part of this specification, and represent, in—

Figure 1, a vertical section on line $x\ x$ of Fig. 2; Fig. 2, a longitudinal section on line $z\ z$ of Fig. 1.

This invention relates to an improvement in that class of water-motors known as "rotary" motors or engines, and, like most of such motors, is adapted for the use of air, water, gas, or steam, and may be used as a liquid-motor; and the invention consists in the construction hereinafter described, and more particularly recited in the claim.

A B are two hollow cylinders, parallel to each other, and united so that their interiors open one to the other, as seen in Fig. 1. Within the cylinder A is a cylinder, C, and in B a cylinder, D, the inner cylinders concentric with their respective outer cylinders, but of less diameter, so as to leave a space, $a$, in the one and $b$ in the other between the outer and inner cylinders.

Annularly around the inner cylinder is a rib, $d$, forming a partition dividing the space $a$ around the two cylinders, making two annular chambers around each of the inner cylinders.

The diameter of the two inner cylinders is such that their peripheries meet and are in contact during their rotation, and the two are geared together by corresponding gears E F on their respective shafts G H, so that the two inner cylinders in rotating move with exactly equal velocity.

At one point on the inner cylinder, and in one of the chambers only, a connection is made between the two cylinders, as seen in Fig. 1, by making a tooth, $e$, on each, and a corresponding depression in the other, so that in rotating these teeth and depressions come together, like the teeth of a gear, and the projection on each cylinder extends so as to run in close contact with the surface of the inner cylinder.

Diametrically opposite these projections, but in the other chamber, are similar depressions and projections. These projections form the abutments or pistons against which the water, or whatever the power may be, is to act.

Into each cylinder, at the center, the inflowing water is led, as seen in Fig. 2, to a transverse passage, L, which passage opens into the farther space or chamber, and as seen in broken lines, Fig. 1, so that the water filling the space above and between the two cylinders imparts its force to those projections, causing the inner cylinder to revolve in the direction of the arrow denoted in Fig. 1. At the same time water passes in the opposite direction into passages P, and is discharged into the other chamber, and so as to act in like manner against the projection $e$ in that chamber, and the cylinders will continue to revolve.

In the bottom of the outer shells or cylinders, and at the center, is the outlet R, opening into and from the cylinders, as seen in broken lines, Fig. 1.

So soon as the projection of the inner cylinders in one chamber passes this opening or outlet, all the water in rear of them will then be free to flow outward, the projections advancing to receive a new force so soon as they shall have risen above the central line; but during the short space between the outlet and the renewal of the force in one chamber the pistons in the other chamber are acting under the full force of the water.

In its turn the second chamber is emptied like the first, and so continuing, each cylinder in its turn discharging the water which has caused it to make its full revolution.

This inflow and discharge may be measured by counting the revolution and knowing the contents of the cylinder, so that it may be used as a meter.

I claim—

The combination of the two outer stationary cylinders, the two inner rotating cylinders forming a chamber in each of the said outer cylinders, and the said chambers circumferentially divided, and with a projection or piston on each of the said inner cylinders in one of the divisions, and similar projections or pistons in the other chamber, but diametrically opposite those in the first chamber, and an inlet to each inner cylinder leading through a transverse passage to each of the said divisions, and an outlet for the discharge of the inflow at each revolution of the inner cylinders, substantially as described.

WM. R. FOX.

Witnesses:
   HUBER CLARK,
   ANSON TOWLE.